United States Patent
Yamaguchi

(10) Patent No.: US 6,701,988 B2
(45) Date of Patent: Mar. 9, 2004

(54) PNEUMATIC RADIAL TIRES

(75) Inventor: Yuuji Yamaguchi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 78 days.

(21) Appl. No.: 09/981,741

(22) Filed: Oct. 19, 2001

(65) Prior Publication Data

US 2002/0153080 A1 Oct. 24, 2002

(30) Foreign Application Priority Data

Oct. 19, 2000 (JP) ........................................ 2000-318954

(51) Int. Cl.[7] .......................... B60C 15/00; B60C 15/06
(52) U.S. Cl. ........................ 152/539; 152/541; 152/542; 152/543; 152/546; 152/547; 152/552
(58) Field of Search ................................ 152/539, 541, 152/542, 543, 546, 555, 552, 554, 547

(56) References Cited

U.S. PATENT DOCUMENTS

| | | | |
|---|---|---|---|
| 4,953,605 A | * | 9/1990 | Kawamura et al. ......... 152/541 |
| 5,196,077 A | * | 3/1993 | Kaga ........................ 152/541 |

FOREIGN PATENT DOCUMENTS

| | | |
|---|---|---|
| EP | 0 251 145 A2 | 1/1988 |
| EP | 0 698 513 A2 | 2/1996 |
| EP | 0 810 106 A2 | 12/1997 |
| JP | 5-16618 | 1/1993 |
| JP | 6-320922 | * 11/1994 |
| JP | 6-328914 | * 11/1994 |
| JP | 7-232520 | * 9/1995 |
| JP | 8-225005 | 9/1996 |
| JP | 8-324214 | 12/1996 |

* cited by examiner

Primary Examiner—Jeff H. Aftergut
Assistant Examiner—Justin Fischer
(74) Attorney, Agent, or Firm—Sughrue Mion, PLLC

(57) ABSTRACT

A pneumatic radial tire having an aspect ratio of no more than 60% comprises at least one carcass ply composed of a main body portion and a turn-up portion, a stiffener made of a soft rubber stock and a hard rubber stock, and a reinforcing member extending at an outside of the turn-up portion in a widthwise direction of the tire through a cushion rubber, wherein at an inflation state of the tire under a given air pressure, a height of an outer end of the turn-up portion in the radial direction is no more than 0.33 times a section height of the carcass ply, and a thickness ratio (d2/d1) is within a range of 1.2–1.8.

7 Claims, 4 Drawing Sheets

Comparative

PNEUMATIC RADIAL TIRES

BACKGROUND OF THE INVENTION

1. Field of the Invention

This invention relates to a pneumatic radial tire, and more particularly to a heavy duty radial tire having an aspect ratio of no more than 60% and largely improving the durability of the bead portion.

2. Description of Related Art

In the pneumatic radial tire running under loading, a pair of sidewall portions located in correspondence to a ground contact face are largely bent, while a bead portion located outward from a rim flange in a radial direction of the tire is deformed toward the outside of the tire or so-called deformation phenomenon of the bead portion is caused, whereby a large compression strain is applied to a turn-up end portion of a carcass ply existing in the bead portion or the sidewall portion.

As a countermeasure for such a compression strain, JP-A-5-16618, JP-A-8-324214 and the like propose an improvement in the structure of a stiffener composed of a soft rubber stock and a hard rubber stock, and an improvement of a cushion rubber arranged at an outside of a turn-up portion of a carcass ply in the widthwise direction of the tire, whereby the improvement of the durability of the bead portion is realized.

On the other hand, the deformation in the circumferential direction is caused at zones ranging from the bead portion to the sidewall portion located in correspondence to a stepping-in part and a kicking-out part of the tread portion in the ground contact face of the tire, respectively, whereby a shearing strain in the circumferential direction is created in the turn-up portion of the carcass ply.

Such a shearing strain can be mitigated by selecting an arranging conformation of the hard rubber stock in the stiffener as disclosed in JP-A-8-225005, whereby the durability of the bead portion can be enhanced.

Recently, the lowering of the aspect ratio of the tire, the increase of the tire size and the like are advanced even in tires for heavy duty vehicles such as trucks, buses and the like and also, the number of tire recappings is increased to increase total input to the bead portion accompanied with the running of the tire under loading. For this end, the durability of the bead portion tends to be lacking even in the aforementioned countermeasures. This is particularly serious in the large-size tires having an aspect ratio of no more than 60%.

That is, the above problem is considered due to the fact that the shearing strain in the circumferential direction is increased in the vicinity of the turn-up end of the carcass ply because the length of a zone ranging from a portion of a maximum tire width to a buttress portion in the cross section, which effectively contributes to absorb the deformation in the circumferential direction of the tire, is decreased accompanied with the lowering of the aspect ratio of the tire, and also the absolute amount of deformation in the circumferential direction in the traction and braking or the shearing strain in the circumferential direction is increased under an advancement in performances of the vehicle and the tire, the increase of the tire size and the like.

SUMMARY OF THE INVENTION

It is, therefore, an object of the invention to provide a pneumatic radial tire largely improving the durability of the bead portion by decreasing the shearing strain in the circumferential direction in the vicinity of the turn-up portion of the carcass ply.

According to the invention, there is the provision of in a pneumatic radial tire having an aspect ratio of no more than 60% and comprising at least one carcass ply composed of a main body portion extending between a pair of bead cores each embedded in the respective bead portion and a turn-up portion wound outward around each bead core in a radial direction of the tire, a stiffener arranged between the main body portion and the turn-up portion on an outside of the bead core in the radial direction of the tire, extending outward in the radial direction of the tire, and made of a soft rubber stock and a hard rubber stock, and a reinforcing member extending at an outside of the turn-up portion in a widthwise direction of the tire through a cushion rubber, the improvement wherein when the tire is inflated under an air pressure corresponding to 10% of a maximum air pressure, a height of an outer end of the turn-up portion in the radial direction is no more than 0.33 times a section height of the carcass ply, and a ratio of a thickness between the main body portion and the reinforcing member to a thickness between the main body portion and the outer end of the turn-up portion in the radial direction as measured on a normal line drawn from the outer end of the turn-up portion in the radial direction onto an outer surface of the main body portion is within a range of 1.2–1.8, preferably 1.3–1.7.

Moreover, the term "section height of the carcass ply" used herein means a height when measuring along the radial direction of the tire between an innermost position of the carcass in the radial direction and an outermost position thereof.

And also, the term "maximum air pressure" used herein means an air pressure corresponding to a maximum load capacity defined in JATMA YEAR BOOK. When the tire is inflated under the air pressure, the tire is first mounted onto an approved rim defined in JATMA YEAR BOOK.

Although the tire having the aspect ratio of no more than 60% is particularly serious in the lacking of the durability of the bead portion, according to the invention, the height of the outer end of the turn-up portion of the carcass ply in the radial direction is made no more than 0.33 times the section height of the carcass ply, whereby force suppressing the deformation of the tire through the rim flange is sufficiently applied to a portion located in the vicinity of the outer end of the turn-up portion in the radial direction under an action of the bead core at a state of mounting the tire onto the rim to advantageously decrease the deformation in the circumferential direction of the portion located in the vicinity of the outer end of the turn-up portion in the radial direction and hence the shearing strain in the circumferential direction, so that the separation of the outer end of the turn-up portion in the radial direction can effectively be prevented. In other words, when the height of the outer end of the turn-up portion in the radial direction is more than 0.33 times, the outer end of the turn-up portion can not sufficiently be subjected to the force suppressing the deformation of the tire through the rim flange.

And also, according to the invention, the ratio of the thickness between the main body portion and the reinforcing member to the thickness between the main body portion and the outer end of the turn-up portion in the radial direction is made 1.2–1.8, more preferably, 1.3–1.7, whereby the reinforcing member is arranged so as to sufficiently be distant outward from the outer end in the radial direction to the outer portion in the widthwise direction of the tire in which the torsion deformation at a ground contact area is large under loading to thereby largely improve the reinforcing effect by the reinforcing member, whereby the amount of deformation in the circumferential direction can advantageously be decreased. That is, the reinforcing member more reinforces the bead portion to the deformation in the circumferential direction under the decrease of the absorption area thereof resulted from the lowering of the aspect ratio of the tire, so that the shearing strain in the circumferential direction in the vicinity of the outer end of the turn-up portion can effectively be decreased.

Therefore, when the ratio is less than 1.2, it is difficult to sufficiently develop the reinforcing function through the reinforcing member, while when it exceeds 1.8, the quantity of heat generation in the cushion rubber between the turn-up portion and the reinforcing member is increased to prematurely promote the thermal deterioration due to the rise of temperature during the running and hence the durability is not totally improved.

In a preferable embodiment of the invention, a wire chafer is arranged from the main body portion of the carcass ply to the turn-up portion thereof along the carcass ply and an outer end thereof in the radial direction along the main body portion is positioned outward from the outer end of the turn-up portion of the carcass ply in the radial direction.

In this case, when cords of the wire chafer are crossed with cords of the carcass ply, the deformation of the bead portion in the circumferential direction can effectively be controlled by the wire chafer.

Moreover, if the outer end of the turn-up portion in the radial direction is positioned outward from the outer end of the wire chafer in the radial direction, the deformation in the circumferential direction concentrates in a zone located in the vicinity of the outer end of the turn-up portion, and hence there is caused a problem that the increase of the shearing strain at the zone become unavoidable.

In another preferable embodiment of the invention, the reinforcing member located at the outside of the turn-up portion in the widthwise direction of the tire is constituted with three or four nylon chafers, at least one of which chafers extends up to an inner portion of the bead core just beneath the bead core in the radial direction, and outer ends of these nylon chafers in the radial direction are positioned outward from the outer end of the turn-up portion in the radial direction.

In this case, the reinforcing member arranged at a large deformation region is made of nylon cords and the cord itself is flexible, so that the concentration of strain at the end of the reinforcing member can be controlled as compared with a case using steel cords to avoid the separation failure at the end of the reinforcing member.

And also, the reinforcing member is comprised of three or four nylon chafers, so that the required reinforcing function can effectively be developed. In this case, when the positions of the outer ends of these nylon chafers in the radial direction are irregular, the shearing strain in the circumferential direction produced in the vicinity of the ends of the nylon chafers can advantageously be dispersed.

In addition, at least one nylon chafer is extended up to the inner portion of the bead core just beneath the bead core in the radial direction to spread the function of the bead core fixing the bead portion to the nylon chafer, whereby the shearing strain in the circumferential direction can forcedly be decreased.

When the number of the nylon chafers is not more than two, the required reinforcing function can not sufficiently be developed, while when it is five or more, rubber is early thermal-degraded by the heat generation accompanied with the increase of the thickness and it is difficult to expect the improvement of the durability of the bead portion.

In the other preferable embodiment of the invention, the stiffener is constituted with a hard rubber stock located inward in the radial direction of the tire and having a Shore-A hardness of no less than 70, and a soft rubber stock located outward in the radial direction of the tire and having a Shore-A hardness of no more than 65. In this case, the deformation (bending deformation, deformation in the circumferential direction) during the running and the lose of bead shape produced in a long-term use can be controlled by the hard rubber stock to improve the durability. However, if the volume of the hard rubber stock is increased over a required volume, the flexible zone is decreased, and the deformation controlling effect itself is weakened, and also the hard rubber stock usually indicating a large heat generation is arranged at the large deformation region to cause demerits in view of the rise of temperature. Furthermore, when the turn-up portion of the carcass ply contacts with the hard rubber stock, strain is inversely concentrated in a contact point by a large difference of rigidity therebetween and hence the improvement of the durability can not be attained. Therefore, the stiffener is preferable to be constituted with the soft rubber stock and the hard rubber stock.

In a yet further preferable embodiment of the invention, a hardness of the cushion rubber is no more than 58, preferably 32–58 as a Shore-A hardness. The cushion rubber acts as a layer of mitigating the shearing strain in the circumferential direction between the turn-up portion and the reinforcing member. When the hardness exceeds 58, the action mitigating the strain based on the deformation of the cushion rubber itself is not sufficient. Moreover, when the hardness is less than 32, the amount of deformation of the cushion rubber in the circumferential direction is too large, so that there is caused a fear of creating not only the separation failure of the outer end of the turn-up portion in the radial direction from the cushion rubber but also the troubles in the cushion rubber.

In a still further preferable embodiment of the invention, a thickness of the hard rubber stock on the normal line drawn from the outer end of the turn-up portion in the radial direction toward the outer surface of the main body portion is made no more than 0.5 times the thickness between the outer end of the turn-up portion in the radial direction and the main body portion. In this case, the difference of rigidity between the inside and the outside of the bead portion in the radial direction of the tire can advantageously be removed while effectively preventing the concentration of the compression strain to the inside of the turn-up end in the widthwise direction of the tire. That is, when the above thickness exceeds 0.5 times, there is caused a fear of separating the outer end of the turn-up portion due to the concentration of the compression strain in the zone located in the vicinity of the outer end.

BRIEF DESCRIPTION OF THE DRAWINGS

The invention will be described with reference to the accompanying drawings, wherein.

DETAILED DESCRIPTION OF THE INVENTION

Figure 1:
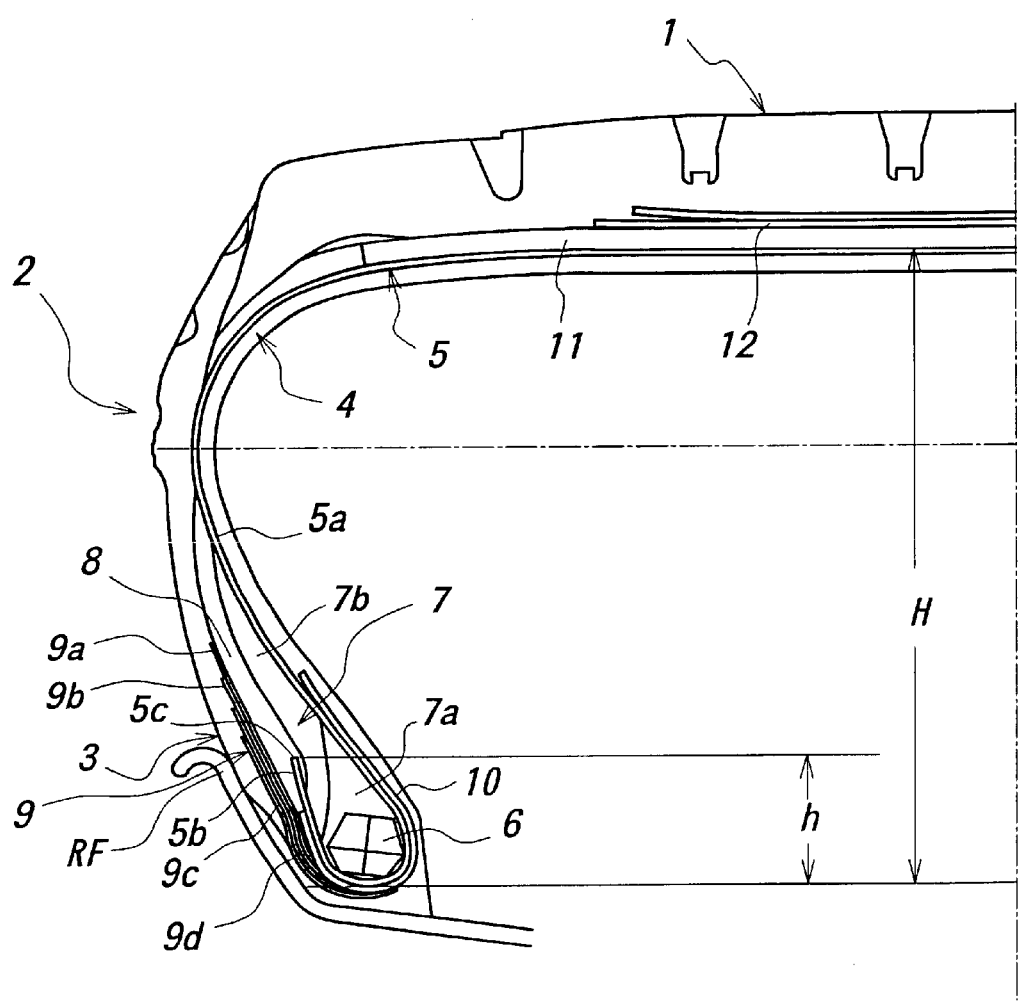
FIG. 1 is a diagrammatically section view of a half portion of an embodiment of the pneumatic radial tire according to the invention.
Figure 2:
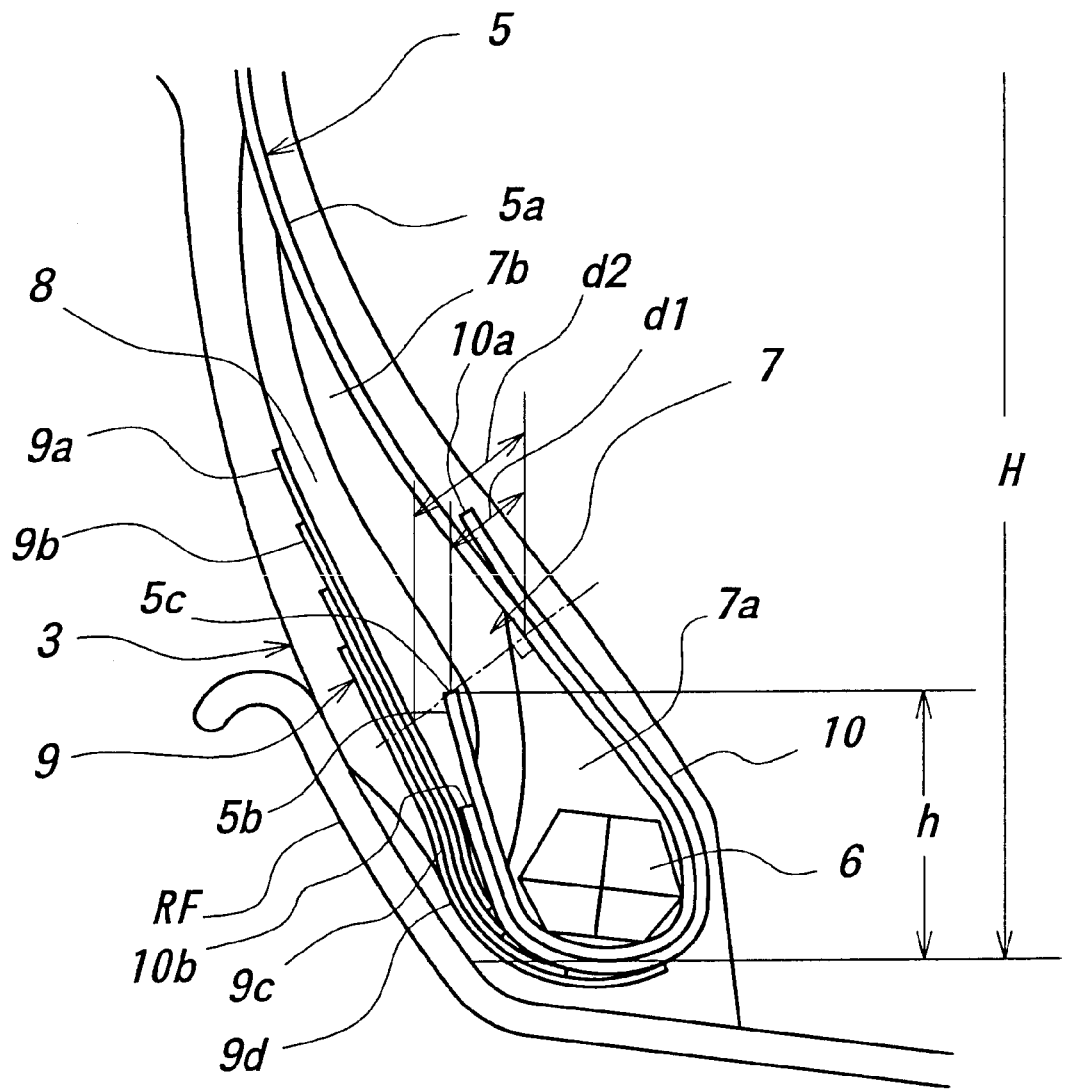
FIG. 2 is an enlarged view of a main portion of FIG. 1.

In FIG. 1 is shown a cross section of a half portion of an embodiment of the tire according to the invention at a state of mounting onto a rim and inflating under an air pressure corresponding to 10% of a maximum air pressure, and FIG. 2 shows an enlarged view of a main portion of the tire shown in FIG. 1.

In FIGS. 1 and 2, numeral 1 is a tread portion, numeral 2 a sidewall portion extending inward from each side end of the tread portion 1 in a radial direction of the tire, numeral 3 a bead portion connecting to an inner end of the sidewall portion 2 in the radial direction of the tire. This tire has an aspect ratio of no more than 60%.

In this embodiment, a radial carcass 4 forming a skeleton structure of the tire and reinforcing each of the above portions 1, 2 and 3 of the tire is comprised of at least one carcass ply 5. The carcass ply 5 comprises a main body portion 5a toroidally extending between a pair of bead cores 6a each embedded in the respective bead portion 3 and a turn-up portion 5b wound outward around each of the bead cores 6 from an inside in the widthwise direction of the tire toward an outside therein.

A stiffener 7 gradually tapering outward in the radial direction of the tire is arranged between the main body portion 5a and the turn-up portion 5b of the carcass ply 5 at an outer circumference of the bead core 6. The stiffener 7 is constituted with a hard rubber stock 7a located inward in the radial direction of the tire so as to thin inward in the widthwise direction of the tire and having preferably a Shore-A hardness of no less than 70, and a soft rubber stock 7b located outward in the radial direction of the tire and having preferably a Shore-A hardness of no more than 65.

And also, a reinforcing member 9 is extended at the outside of the turn-up portion 5b of the carcass ply 5 in the widthwise direction of the tire through a cushion rubber 8 having preferably a Shore-A hardness of no more than 58. Preferably, the reinforcing member 9 is comprised of three or four nylon chafers, i.e. four nylon chafers 9a–9d in the illustrated embodiment. In this case, outer ends of these nylon chafers 9a–9d in the radial direction are positioned stepwise at the outside of the turn-up portion 5b. In the illustrated embodiment, the outer end of the nylon chafer 9a in the radial direction contacting with the cushion rubber 8 is positioned at an outermost side in the radial direction. Moreover, at least one of the nylon chafers, i.e. the nylon chafer 9d located at the widthwise outermost side in the illustrated embodiment is extended up to a position of the inner portion of the bead core just beneath the bead core 6 in the radial direction to enhance a restraining force of the bead core 6 to the reinforcing member 9.

Furthermore, a height h of the outer end of the turn-up portion 5b in the radial direction is made no more than 0.33 times a section height H of the carcass ply 5 to enhance a restraining force of a rim flange RF to the turn-up portion 5b, while a ratio (d2/d1) of a thickness d2 between the main body portion 5a and the reinforcing member 9 to a thickness d1 between the outer end 5c of the turn-up portion 5b in the radial direction and the main body portion 5a as measured on a normal line drawn from the outer end 5c of the turn-up portion 5b in the radial direction onto an outer surface of the main body portion 5a is made within a range of 1.2–1.8 to ensure a sufficient development of the reinforcing function through the reinforcing member 9 without the excessive heat generation of the cushion rubber 8.

In this embodiment, a thickness of the hard rubber stock 7a on the above normal line is further made no more than 0.5 times the thickness d1, and a wire chafer 10 is arranged from the main body portion 5a of the carcass ply 5 to the turn-up portion 5b thereof along the carcass ply 5. An outer end 10a of the wire chafer 10 in the radial direction extending along the main body portion 5a is positioned outward from the outer end 5c of the turn-up portion 5b in the radial direction, while an outer end 10b of the wire chafer 10 in the radial direction extending along the turn-up portion 5b is positioned inward from the outer end 5c of the turn-up portion 5b in the radial direction.

Moreover, numeral 11 is a belt, and numeral 12 a belt reinforcing layer. The belt 11 is comprised of one or more belt layers containing cords each extending wavily in the circumferential direction, and the belt reinforcing layer 12 is comprised of two steel cord layers, cords of which layers being crossed with each other at a cord angle of 30–70° with respect to the circumference of the tread.

According to the tire having the above construction, by particularly specifying the height of the outer end of the turn-up portion 5b of the carcass ply in the radial direction, the thickness of each portion on the normal line passing through the outer end 5c of the turn-up portion 5b and the like, even in large-size radial tires for heavy duty vehicles having a low aspect ratio, the shearing strain in the circumferential direction at the zone located in the vicinity of the outer end 5c of the turn-up portion can advantageously be decreased to largely improve the durability of the bead portion as mentioned above.

The following examples are given in illustration of the invention and are not intended as limitations thereof.

EXAMPLE 1

Figure 3:
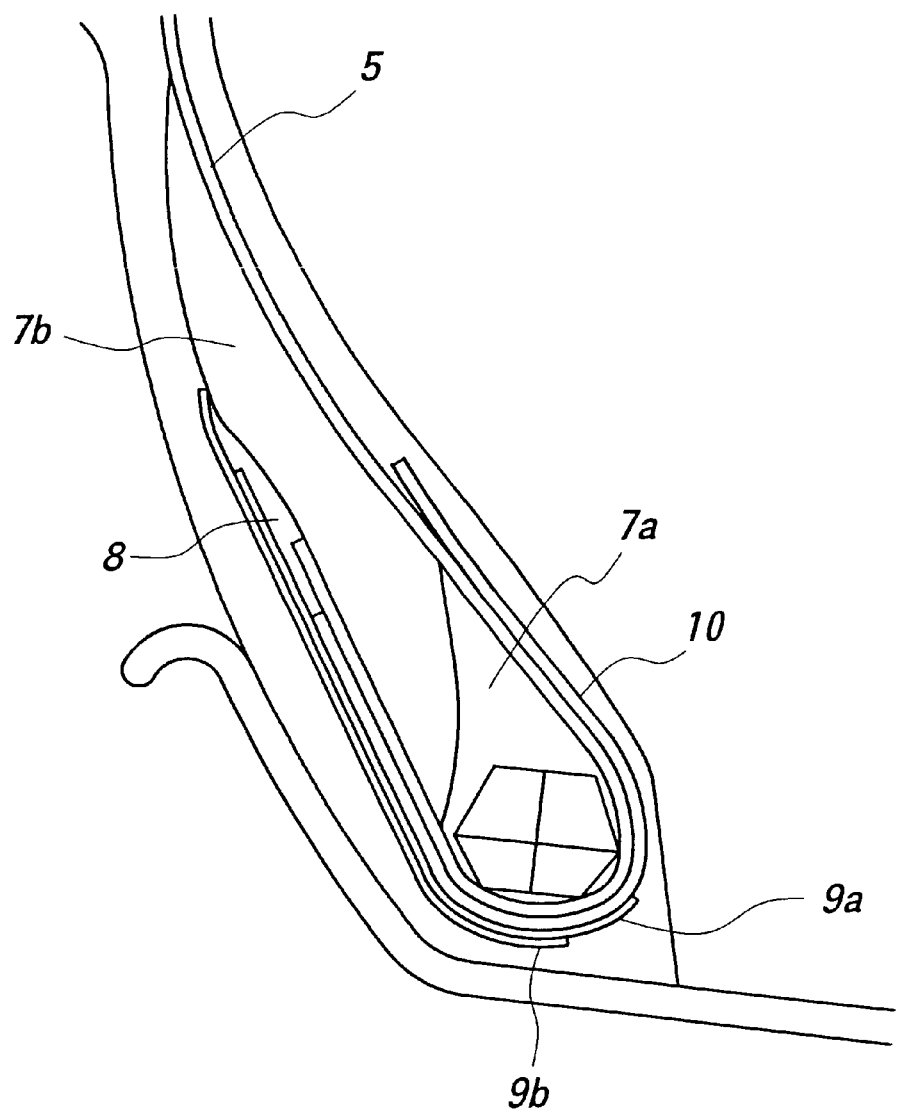
FIG. 3 is an enlarged view of a main portion in a structure of a comparative tire.

There are provided various heavy duty radial tires having a tire size of 285/60R22.5, wherein example tires have a structure as shown in FIG. 1 or a structure having two nylon chafers, and comparative tires have a structure as shown in FIG. 3 or a structure having four nylon chafers. Moreover, Table 1 represents the ratio h/H of the height h of the outer end of the turn-up portion in the radial direction with respect to the section height H of the carcass ply and the ratio d2/d1 of a thickness d2 between the main body portion and the reinforcing member with respect to the thickness d1 between the outer end of the turn-up portion in the radial direction and the main body portion. With respect to these tires, the test for evaluating the durability of the bead portion is carried out to obtain results as shown in Table 1.

In the above test, the tire is mounted onto an approved rim of 9.00×22.5 under a maximum air pressure of 900 kPa and run on a drum testing machine having a radius of 1.7 m at a speed of 60 km/h under a load corresponding to 1.5 times a maximum load capacity of 3150 kg condition of the maximum inflation pressure of 900 kPa, the approved rim of 9.00×22.5 and weight corresponding to 1.5 times the maximum load capacity of 3150 kg until the breakage of the bead portion. The durability is represented by an index on the basis that comparative tire 1 is 100, wherein the larger the index value, the better the durability.

TABLE 1

|  | Comparative tire 1 | Comparative tire 2 | Comparative tire 3 | Example tire 1 | Example tire 2 | Example tire 3 | Example tire 4 | Example tire 5 | Example tire 6 | Example tire 7 |
|---|---|---|---|---|---|---|---|---|---|---|
| h/H | 0.21 | 0.35 | 0.21 | 0.21 | 0.21 | 0.21 | 0.21 | 0.21 | 0.21 | 0.21 |
| d2/d1 | 1.17 | 1.17 | 1.17 | 1.6 | 1.6 | 1.6 | 1.6 | 1.6 | 1.6 | 1.6 |
| Radially outer end of wire chafer positioned outward from radially outer end of turnup portion | ○ | ○ | ○ | ○ | × | ○ | ○ | ○ | ○ | ○ |
| Construction of bead portion | Wa + 4N | Wa + 4N | Wa + 2N | Wa + 4N | Wa + 4N | Wa+ 2N | Wa + 4N | Wa + 4N | Wa + 4N | Wa +4N |
| Hardness of hard rubber stock and soft rubber stock | 72, 63 | 72, 63 | 72, 63 | 72, 63 | 72, 63 | 72, 63 | 72, 68 | 66, 63 | 72, 63 | 72, 63 |
| Hardness of cushion rubber | 50 | 50 | 50 | 50 | 50 | 50 | 50 | 50 | 60 | 50 |
| Ratio of thickness of hard rubber stock to thickness d1 | 0.4 | 0.4 | 0.4 | 0.4 | 0.4 | 0.4 | 0.4 | 0.4 | 0.4 | 0.6 |
| Durability on drum (index) | 100 | 70 | 80 | 150 | 115 | 120 | 135 | 135 | 120 | 140 |

Wa: wire chafer
N: nylon chafer

As seen from the results of Table 1, the example tires can effectively improve the durability of the bead portion as compared with the comparative tires.

EXAMPLE 2

Figure 4:
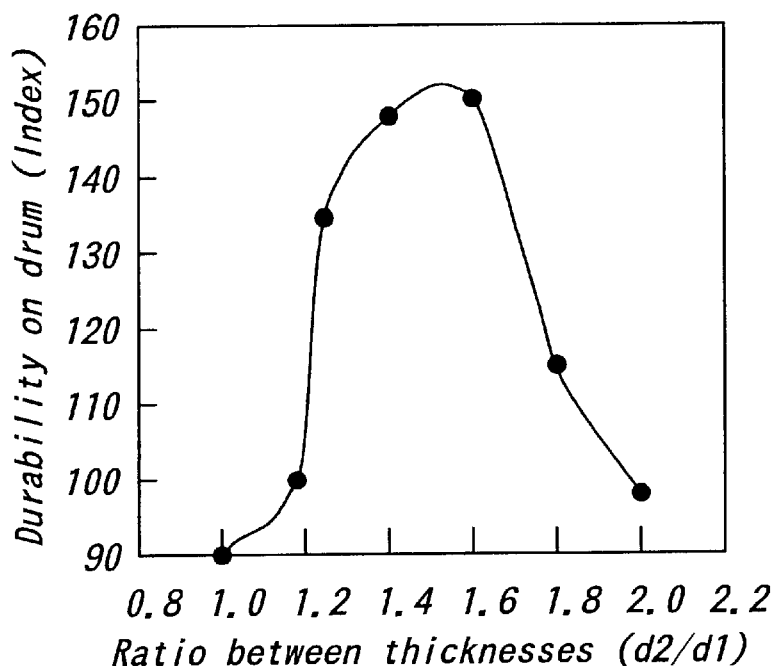
FIG. 4 is a graph showing an influence of thickness ratio (d2/d1) upon durability of the bead portion.
Figure 5:
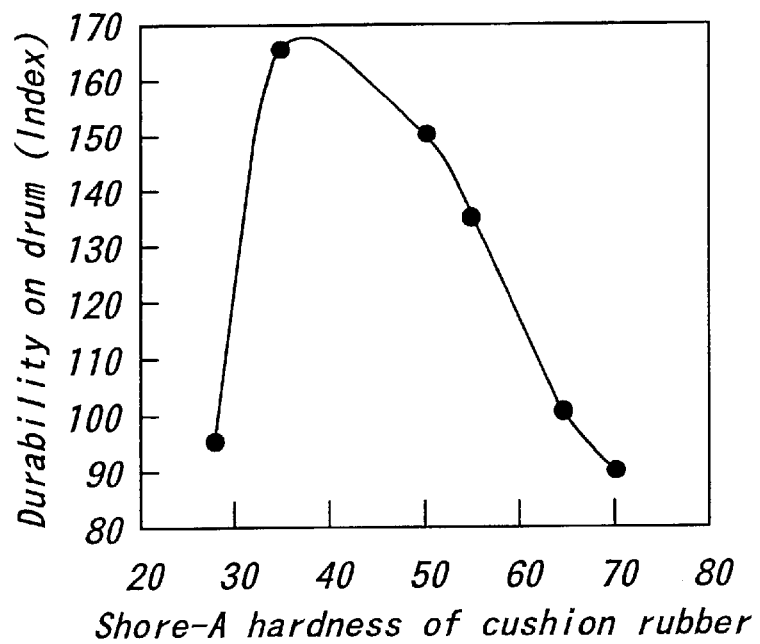
FIG. 5 is a graph showing an influence of hardness of cushion rubber upon durability of the bead portion.

With respect to the tire having a tire size of 285/60R22.5 and a structure shown in FIGS. 1 and 2, the test for evaluating the durability on the drum is carried out by varying each of the thickness ratio (d2/d1) and the hardness of the cushion rubber as a parameter to obtain results as shown in graphs of FIGS. 4 and 5.

As seen from these graphs, when the thickness ratio (d2/d1) is a range of 1.2–1.8, particularly 1.3–1.7, the excellent durability can be developed, and also when the hardness of the cushion rubber is no more than 58, particularly 32–58, the excellent durability can be developed.

As mentioned above, according to the invention, even in large-size tires having a low aspect ratio, the durability of the bead portion can sufficiently be improved, and also even if the tire is repeatedly recapped, the excellent durability can be developed.

What is claimed is:

1. In a pneumatic radial tire having an aspect ratio of no more than 60% and comprising at least one carcass ply composed of a main body portion extending between a pair of bead cores each embedded in the respective bead portion and a turn-up portion wound around each bead core in a radial direction of the tire, a stiffener arranged between the main body portion and the turn-up portion on an outside of the bead core in the radial direction of the tire, extending outward in the radial direction of the tire, and made of a soft rubber stock and a hard rubber stock, and a reinforcing member extending at an outside of the turn-up portion in a widthwise direction of the tire through a cushion rubber, the improvement wherein when the tire is inflated under an air pressure corresponding to 10% of a maximum air pressure, a height of an outer end of the turn-up portion in the radial direction is no more than 0.33 times a section height of the carcass ply, and a ratio of a thickness between the main body portion and the reinforcing member to a thickness between the main body portion and the outer end of the turn-up portion in the radial direction as measured on a normal line drawn from the outer end of the turn-up portion in the radial direction onto an outer surface of the main body portion is within a range of 1.2–1.8.

2. A pneumatic radial tire according to claim 1, wherein a wire chafer is arranged from the main body portion of the carcass ply to the turn-up portion thereof along the carcass ply and an outer end thereof in the radial direction along the main body portion is positioned outward from the outer end of the turn-up portion of the carcass ply in the radial direction.

3. A pneumatic radial tire according to claim 1, wherein the reinforcing member located at the outside of the turn-up portion in the widthwise direction of the tire is constituted with three or four nylon chafers, at least one of which chafers extends up to an inner portion of the bead core just beneath the bead core in the radial direction, and outer ends of these nylon chafers in the radial direction are positioned outward from the outer end of the turn-up portion in the radial direction.

4. A pneumatic radial tire according to claim 1, wherein the stiffener is constituted with a hard rubber stock located inward in the radial direction of the tire and having a Shore-A hardness of no less than 70, and a soft rubber stock located outward in the radial direction of the tire and having a Shore-A hardness of no more than 65.

5. A pneumatic radial tire according to claim 1, wherein the cushion rubber has a Shore-A hardness of no more than 58.

6. A pneumatic radial tire according to claim 1, wherein a thickness of the hard rubber stock on the normal line drawn from the outer end of the turn-up portion in the radial direction toward the outer surface of the main body portion is made no more than 0.5 times the thickness between the outer end of the turn-up portion in the radial direction and the main body portion.

7. A pneumatic radial tire according to claim 1, wherein the cushion rubber has a Shore-A hardness softer than that of the soft rubber stock.

* * * * *